(12) United States Patent
Click, Jr. et al.

(10) Patent No.: US 6,381,737 B1
(45) Date of Patent: Apr. 30, 2002

(54) AUTOMATIC ADAPTER/STUB GENERATOR

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/298,637

(22) Filed: Apr. 23, 1999

(51) Int. Cl.[7] .................................................. G06F 9/45
(52) U.S. Cl. ................... 717/5; 717/2; 717/10; 709/312; 709/332
(58) Field of Search .............. 717/2–5, 9, 10; 709/1, 312, 331, 332

(56) References Cited

U.S. PATENT DOCUMENTS

| 5,553,286 A | * | 9/1996 | Lee | 717/5 |
| 5,659,751 A | * | 8/1997 | Heninger | 709/305 |
| 5,822,591 A | * | 10/1998 | Hochmuth | 717/5 |
| 6,074,432 A | * | 6/2000 | Guccione | 717/2 |
| 6,202,208 B1 | * | 3/2001 | Holiday, Jr. | 717/11 |

OTHER PUBLICATIONS

Rayside et al., "Change and Adaptive Maintenance Detection in Java Software Systems," Proceedings, IEEE Fifth Working Conference on Reverse Engineering, 1998, pp. 10–19.*

* cited by examiner

Primary Examiner—Tuan Q. Dam
(74) Attorney, Agent, or Firm—Beyer Weaver & Thomas, LLP

(57) ABSTRACT

Systems and methods for automatically providing an adapter or a stub in a runtime environment are provided. An adapter generator is provided with input parameters that are in turn processed and input to a compiler. The compiler, in turn, is coupled to an adapter library used to store the generated adapters. The adapter library, in turn, provides adapters, on demand to a runtime system when executing a bytecode, or a series of bytecodes.

7 Claims, 7 Drawing Sheets

AUTOMATIC ADAPTER/STUB GENERATOR

CROSS REFERENCE TO RELATED APPLICATION

This application is related to Provisional Application No. 60/130,671 filed Apr. 23, 1999, and entitled "FILE PORTABILITY TECHNIQUES" which is hereby incorporated by reference. This application is also related to (i) U.S. application Ser. No. 09/298,327 filed Apr. 23, 1999 and entitled "FILE PORTABILITY TECHNIQUES" which is hereby incorporated by reference, and (ii) U.S. application Ser. No. 09/298,251 filed Apr. 23, 1999, now U.S. Pat. No. 6,286,134, and entitled "INSTRUCTION SELECTION IN A MULTI-PLATFORM ENVIRONMENT" which is hereby incorporated by reference.

BACKGROUND OF THE INVENTION

1. Field of Invention

The invention relates generally to computer systems. More particularly, methods and apparatus for automatically generating stubs in a multi-platform environment are disclosed.

2. Description of Relevant Art

The Java™ programming language is an object-oriented high level programming language developed by Sun Microsystems and designed to be portable enough to be executed on a wide range of computers ranging from small personal computers up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer that is a major factor in allowing computer programs for the Java virtual machine to be platform independent.

The Java virtual machine is commonly implemented as a software interpreter. Conventional interpreters decode and execute the virtual machine instructions of an interpreted program one instruction at a time during execution. Compilers, on the other hand, decode source code into native machine instructions prior to execution so that decoding is not performed during execution. Because conventional interpreters decode each instruction before it is executed repeatedly each time the instruction is encountered, execution of interpreted programs is typically quite a bit slower than compiled programs because the native machine instructions of compiled programs can be executed on the native machine or computer system without necessitating decoding. Therefore, whenever performance is a significant factor, it is desirable to decode source code using the compiler instead of the interpreter. In order to accomplish this, however, what is referred to as an adapter translates the execution stack used by the platform dependent interpreter to a form that is consistent with what the platform dependent compiler expects. Unfortunately, since the code generated by the platform dependent compiler may store and communicate information in a manner different than the interpreter, a platform specific adapter must be constructed for each platform on which the virtual machine runs. This typically requires a user to generate an adapter using, for example, assembler language or C++ code, for each platform. Coding an adapter for each platform on which the virtual machine runs is quite time consuming and prone to error.

Typically, the Java virtual machine will be written in a programming language other than the Java programming language (e.g., the C++ programming language). Therefore, execution of a Java program may involve execution of functions written in multiple programming languages. Additionally, the bytecodes themselves may call native functions (e.g., system specific functions for input/output) that are not written in the Java programming language. It is therefore common for an executing Java program to entail the execution of functions that were written in multiple programming languages. A RPC (Remote Procedure Call) is a protocol that one program can use to request a service from a program located in another computer in a network without having to understand network details. A procedure call is also sometimes known as a function call or a subroutine call. Using a client server model, the requesting program is a client and the service-providing program is the server. As in a regular or local procedure call, an RPC is a synchronous operation requiring the requesting program to be suspended until the results of the remote procedure are returned. However, the use of lightweight processes or threads that share the same address space allows multiple RPCs to be performed concurrently.

When program statements that use RPC are compiled into an executable program, a stub is included in the compiled code that acts as the representative of the remote procedure code. A stub is a small program routine that substitutes for a longer program, possibly to be loaded later or that is located remotely. For example, a program that uses Remote Procedure Calls (RPCs) is compiled with stubs that substitute for the program that provides a requested procedure. The stub accepts the request and then forwards it (through another program) to the remote procedure. When that procedure has completed its service, it returns the results or other status to the stub that passes it back to the program that made the request.

As with the adapter, in conventional virtual machines, a manually coded stub library is required for every platform on which the virtual machine runs. Coding a stub for every RPC for each platform on which the virtual machine runs is quite time consuming and prone to error.

Accordingly, there is a need for techniques for automatically generating a library of platform dependent adapters. Additionally, there is a need to provide techniques for automatically providing a library of platform dependent stubs for each platform on which the virtual machine runs.

SUMMARY OF THE INVENTION

In general, embodiments of the present invention provide innovative systems and methods for automatically generating a library of platform dependent adapters and stubs for use in a virtual machine.

An apparatus for executing a bytecode in runtime system and automatically providing an adapter or a stub is disclosed. The apparatus includes a bytecode source coupled to an interpreter unit. The interpreter being used to interpret the bytecode. The interpreter is in turn coupled to the runtime system which executes the interpreted bytecode. The bytecode source is also coupled to a compiler that is used to compile the bytecode. The compiler, in turn, is coupled to the runtime system that executes the compiled bytecode. The apparatus also includes an adapter/stub generator unit coupled to the compiler that provides on demand an adapter or a stub to the runtime system as needed.

In a preferred embodiment, a library coupled to the runtime system is used to store adapters and stubs which are then retrieved as needed by the runtime system.

In another embodiment, a computer program product that implements an apparatus for processing a bytecode in a runtime system is disclosed. The program product includes computer code that interprets a received bytecode and passes the interpreted bytecode to the runtime system to be executed. The computer code also compiles the received bytecode and passes the compiled bytecode to the runtime system for execution. The computer code also generates an adapter when requested by the runtime system in order to execute the bytecode.

In another embodiment, a computer implemented method for processing a bytecode in a runtime environment is disclosed. If an adapter is required in order to process the bytecode a determination is made whether or not the required adapter is in an adapter library. If the required adapter is not in the adapter library, the an adapter generator builds the adapter and stores it in the library which then provides the adapter to the runtime system which then executes the bytecode.

Other features and advantages of the invention will become readily apparent upon review of the following detailed description in association with the accompanying drawings.

DETAILED DESCRIPTION OF THE EMBODIMENTS

Definitions

Function—A software routine (also called a subroutine, procedure, member function, and method).

Frame (or activation frame, activation record)—A record that is stored on the execution stack for a function to store information for execution of the function, such information may include state variables, local variables and an operand stack.

Execution stack—A stack utilized during program execution to store frames for functions in their sequential calling order. When a function ("callee") is called, a frame for the function is pushed on the execution stack. Subsequently, when the function terminates, the frame is popped off the stack and the function ("caller") for the frame on the top of the execution stack resumes execution.

Operand stack—A stack utilized to store operands for use by machine instructions during execution.

External code—Computer code that is written in a programming language other than a specific programming language (e.g., the Java programming language). For example, the Java virtual machine may be written in the C++ programming language and the Java virtual machine could be deemed external code in reference to the Java code of a program that is being interpreted (external code include native methods).

Native methods—Functions that are written in a programming language other than the Java programming language. Native methods may be called by a Java program that causes them to be dynamically loaded and executed. Additionally, native methods may call functions written in the Java programming language.

In the description that follows, the present invention will be described in reference to a preferred embodiment that implements an execution stack for a Java virtual machine that executes a Java program (e.g., bytecodes). In particular, examples will be described in which the Java virtual machine is written in the C++ programming language. However, the invention is not limited to any particular language, computer architecture, or specific implementation. Therefore, the description of the embodiments that follow is for purposes of illustration and not limitation.

Figure 1:
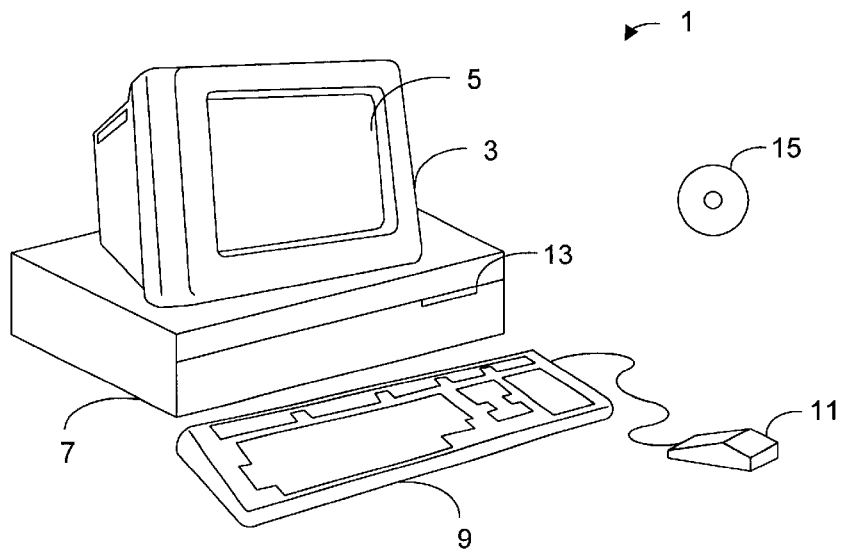
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
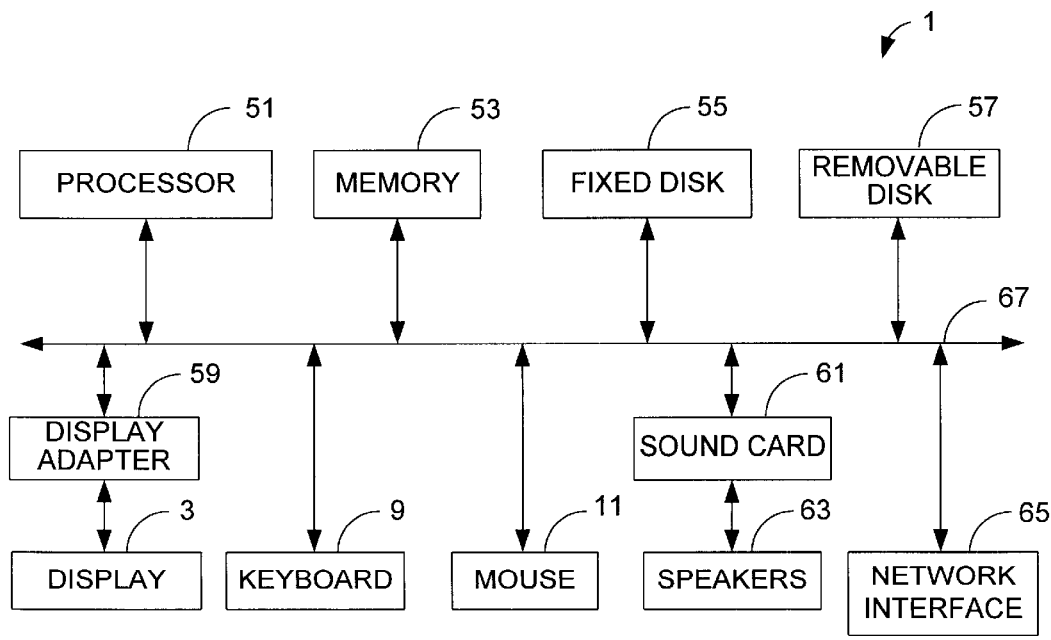
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
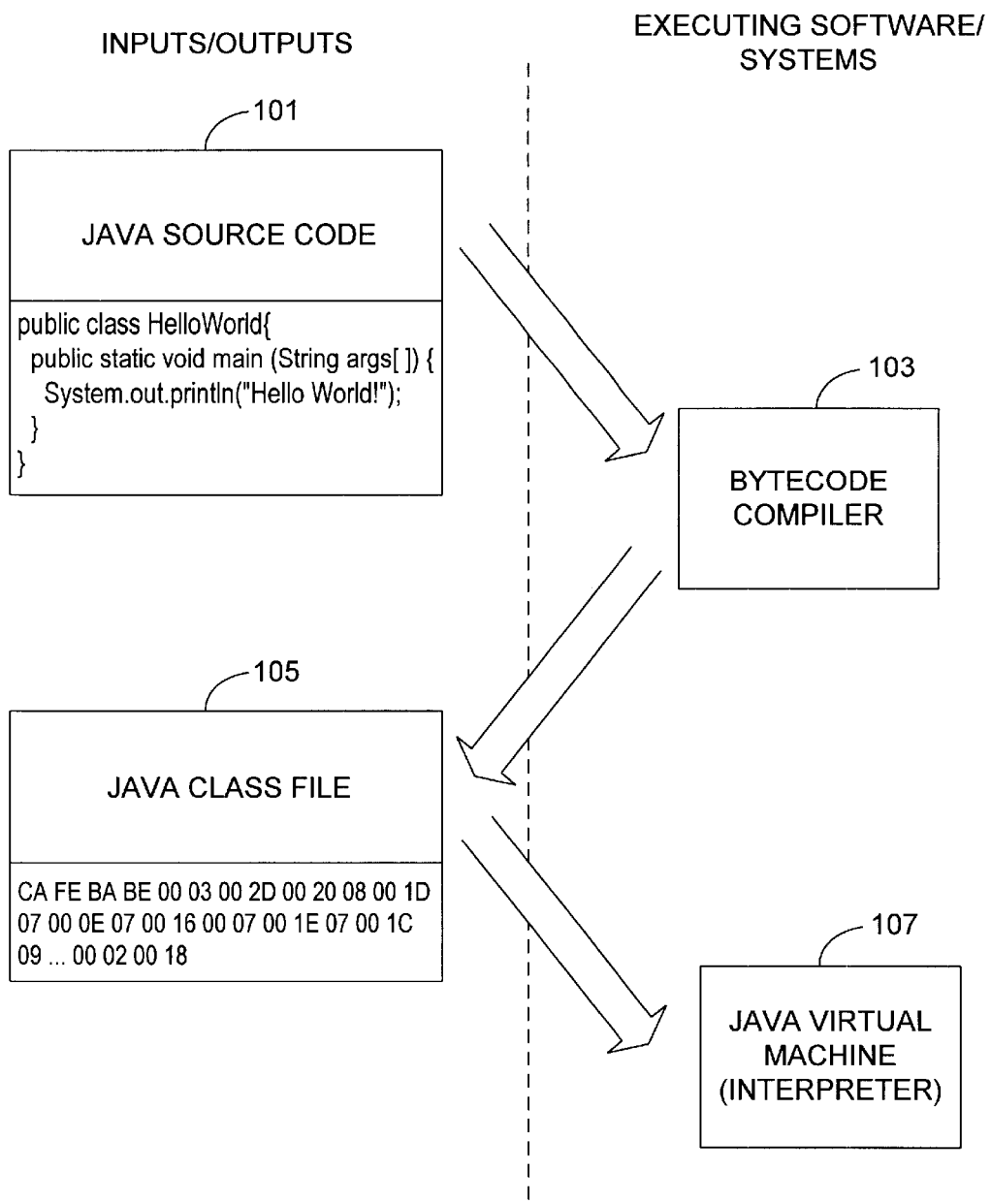
FIG. 3 shows how a Java source code program is executed.

Typically, computer programs written in the Java programming language are compiled into bytecodes or Java virtual machine instructions that are then executed by a Java virtual machine. The bytecodes are stored in class files that are input into the Java virtual machine for interpretation. FIG. 3 shows a progression of a simple piece of Java source code through execution by an interpreter in the Java virtual machine.

Java source code 101 includes the classic Hello World program written in Java. The source code is then input into a bytecode compiler 103 that compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 that includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist in hardware).

Figure 4:
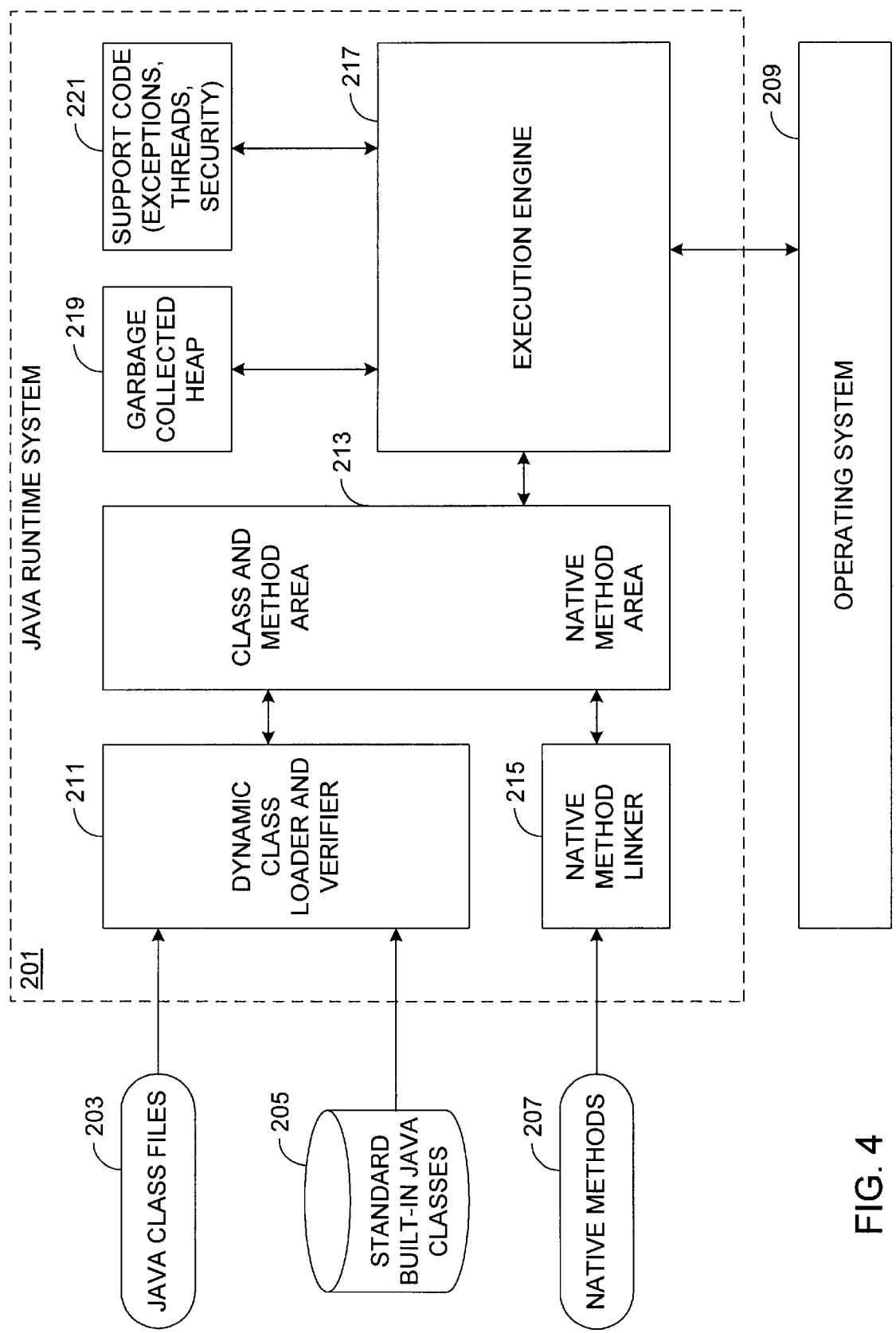
FIG. 4 shows the components of an implementation of a Java runtime system.

FIG. 4 shows the components of an implementation of a Java runtime system. Implementations of the Java virtual machine are known as Java runtime systems. A Java runtime system 201 may receive input of Java class files 203, standard built-in Java classes 205 and native methods 207 in order to execute a Java program. The standard built-in Java classes may be classes for objects such as threads, strings and the like. The native methods may be written in programming languages other than the Java programming language. The native methods are typically stored in dynamic link libraries (DLLs) or shared libraries.

The Java runtime system may also interface with an operating system 209. For example, input/output functions may be handled by the operating system, including providing the Java runtime system with interfaces to Java class files 203, standard built-in Java classes 205 and native methods 207.

A dynamic class loader and verifier 211 loads Java class files 203 and standard built-in Java classes 205 via operating system 209 into a memory 213. Additionally, the dynamic class loader and verifier may verify the correctness of the bytecodes in the Java class files, reporting any errors that are detected.

A native method linker 215 links in native methods 207 via operating system 209 into the Java runtime system and stores the native methods in memory 213. As shown, memory 213 may include a class and method area for the Java classes and a native method area for native methods. The class and method area in memory 213 may be stored in a garbage collected heap. As new objects are created, they are stored in the garbage collected heap. The Java runtime system, not the application, is responsible for reclaiming memory in the garbage collected heap when space is no longer being utilized.

At the heart of the Java runtime system shown in FIG. 4 is an execution engine 217. The execution engine carries out the instructions stored in memory 213 and may be implemented in software, hardware or a combination of the two. The execution engine supports object-oriented applications and conceptually, there are multiple execution engines running concurrently, one for each Java thread. Execution engine 217 may also utilize support code 221. The support code may provide functionality relating to exceptions, threads, security, and the like.

As a Java program executes, functions are sequentially called within each thread. For each thread there is an execution stack which stores frames for each of the functions that have not completed execution. A frame stores information for execution of the function, such information may include state variables, local variables and an operand stack. As a function is called, a frame for the function is pushed on the execution stack. When the function terminates, the function's frame is popped off the execution stack. Accordingly, only the function corresponding to the frame on the top of the execution stack is active, the functions that correspond to frames below the top of the execution stack have had their execution suspended until the function they called returns (i.e., terminates).

Figure 5:
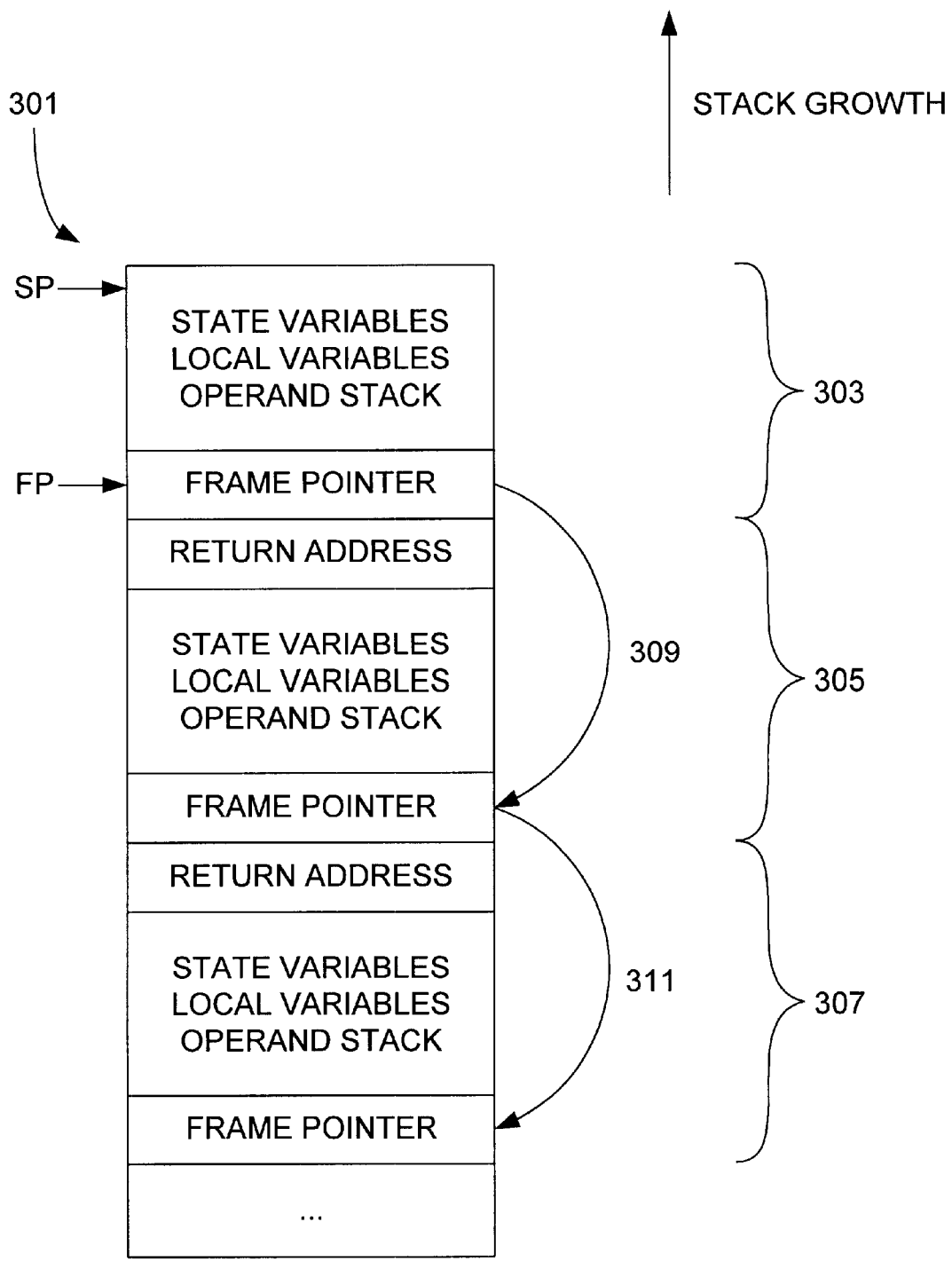
FIG. 5 illustrates frames for functions that are stored on an execution stack.

FIG. 5 illustrates frames for functions that are stored on an execution stack. An execution stack 301 is shown having a frame 303 on the top of the execution stack and frames 305 and 307 stored below frame 303, respectively. A stack pointer SP points to the top of the execution stack while a frame pointer FP points to a frame pointer in the frame on the top of execution stack 301.

Each frame is shown to include state variables, local variables and an operand stack for the function corresponding to the frame. Additionally, the last item stored in the frame is a frame pointer which points to the frame pointer in the frame below the current frame on the execution stack as shown by arrows 309 and 311.

When a function calls another function, the system first pushes the return address for the current function on execution stack 301 and then pushes a new frame for the recently called function. In this manner, when the new function returns, the system is able to pop the frame at the top of the execution stack and then pop the return address off the execution stack and set the program counter equal to this return address so that execution of the calling function may resume. Accordingly, that is the reason frames 305 and 307 include return addresses and the active frame 303 does not include a return address. However, if the function corresponding to frame 303 calls another function, the return address would be pushed on execution stack 301 before the frame for the new function is pushed on the execution stack.

The frame pointers allow the system to accurately traverse the frames on the execution stack. For example, stack pointer SP and frame pointer FP delineate the frame on the top of the execution stack. Furthermore, the frame pointer in frame 303 specifies the next frame on the execution stack. The address just below the frame pointer in frame 303 is the beginning of the next frame on the execution stack and the contents of the frame pointer of frame 303 specify the last item in the next frame on the execution stack which is frame 305. Similarly, the frame pointer in frame 305 specifies the location of the next frame on the execution stack. Therefore, the chain of frame pointers allows the system to traverse the frames on the execution stack (e.g., when the frames are popped off the execution stack).

Although FIG. 5 shows an implementation of an execution stack, the invention is not limited to the implementation shown. For example, the execution stack is shown as growing upwards in memory, however, it should be clear that the stack may also grow downwards in memory. Furthermore, the information stored in each frame may vary depending upon the implementation.

More recently, the Java programming language, an object-oriented language, has introduced the possibility of compiling output (called bytecode) that can run on any computer system platform for which a Java virtual machine (or bytecode interpreter) is provided. The Java virtual machine is designed to convert the bytecode into instructions that can be executed by the actual hardware processor. Using this virtual machine, rather than being interpreted one instruction at a time, bytecode can be recompiled at each particular system platform by, in some cases, a just-in-time (JIT) compiler.

Figure 6:
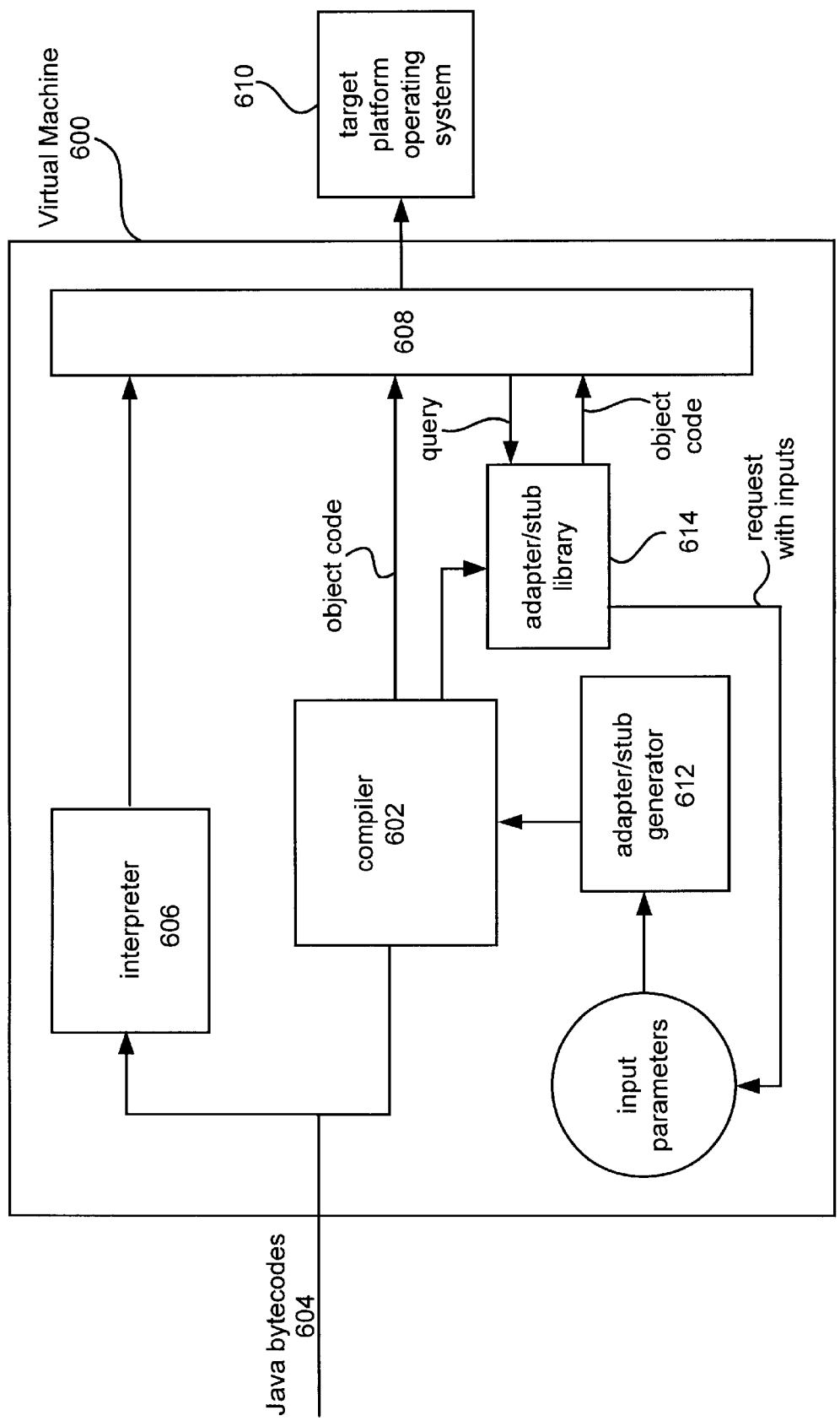
FIG. 6 shows an embodiment of the invention in a Java Virtual Machine.

FIG. 6 illustrates an apparatus that includes a Java Virtual Machine (JVM) 600 in accordance with an embodiment of the invention. In the Java programming language and environment, a just-in-time (JIT) compiler is a program that turns Java bytecode into instructions that can be sent directly to the processor. After a Java program has been written, the Java source language statements are compiled by the Java compiler into Java bytecode rather than into code that contains instructions that match a particular hardware platform's processor (for example, an Intel Pentium microprocessor or an IBM System/390 processor). The Java bytecode is platform-independent code that can be sent to any platform and run on that platform.

More particularly, when bytecodes are provided to a JIT compiler provided by a compiler 602, the compilation of methods contained in bytecodes 604 is delayed until the methods are about to be executed. When bytecodes 604 are provided to an interpreter 606, bytecodes 604 are read into interpreter 606 one bytecode at a time. Interpreter 606 then loads parameters corresponding to the operations defined by the bytecode into the execution stack 500. Once loaded, the interpreter 606 performs the operation defined by the bytecode 604. That is, interpreter 606 "interprets" bytecodes 604, as will be appreciated by those skilled in the art. In general, interpreter 606 processes bytecodes 604 and performs operations associated with bytecodes 604 substantially continuously.

When a method is invoked by another method or, if the method is interpreted, runtime system 608 obtains the method in the form of a sequence of bytecodes 604, which may be directly executed by interpreter 606. If, on the other hand, the method which is invoked is a compiled method which has not been compiled, runtime system 608 also obtains the method in the form of a sequence of bytecodes 604, then may go on to activate the platform specific compiler provided by the compiler 602. The compiler 602 then generates machine instructions from bytecodes 604, and the resulting machine-language instructions may be executed directly by the target platform operating system 610. In general, the machine-language instructions are discarded when virtual machine 600 terminates. The operation of virtual machines or, more particularly, Java™ virtual machines, is described in more detail in The Java™ Virtual Machine Specification by Tim Lindholm and Frank Yellin (ISBN 0-201-63452-X), which is incorporated herein by reference.

In order to compile a bytecode or sequence of bytecodes in the compiler 602, however, a finite amount of compilation time is required. Compilers decode source code into native machine instructions prior to execution so that decoding is not performed during execution. Because conventional interpreters decode each source code instruction before it is executed repeatedly each time the instruction is encountered, execution of interpreted programs is typically quite a bit slower than compiled programs because the native machine instructions of compiled programs can be executed on the native machine or computer system without necessitating source code decoding. Therefore, whenever performance is a significant factor, it is desirable to decode source code using the compiler instead of the interpreter. Therefore, when a bytecode or sequence of bytecodes is received by the virtual machine 600, a determination is made whether or not the bytecode or sequence of bytecodes is to be interpreted by the interpreter or compiled by the compiler. In the case where a received bytecode or sequence of bytecodes is to be processed by executing compiled code, for example, and the previous bytecode or sequence of bytecodes had been processed by the interpreter, a platform specific adapter must be provided. The platform specific interpreter to compiled-code (I/C) adapter is used to translate the execution stack 500 used by the interpreter to one that can be used by the compiled code. In addition, the adapter may update the state of other components in the system.

Alternatively, when a previous bytecode or sequence of bytecodes has been processed by executing compiled code, possibly generated by the compiler 602, and it is determined to be more execution efficient to interpret the current bytecode or sequence of bytecodes, then a compiled-code to interpreter (C/I) adapter must be provided to appropriately translate the execution stack 500 to one that can be used by the interpreter. In addition, the adapter may update the state of other components in the system.

When either an I/C adapter or a C/I adapter is created, it is stored in a library 614 coupled to the compiler 602 and the runtime system 608. In this way, whenever it is determined that a particular adapter is required, then the library 614 is queried and if that particular adapter is not present, then it is created. In order to create a particular platform specific adapter, various platform dependent inputs are required. In one embodiment, these inputs include, for example, known type of caller, known type of callee, known parameter number and types for callee, calling convention, etc.

Figure 7:
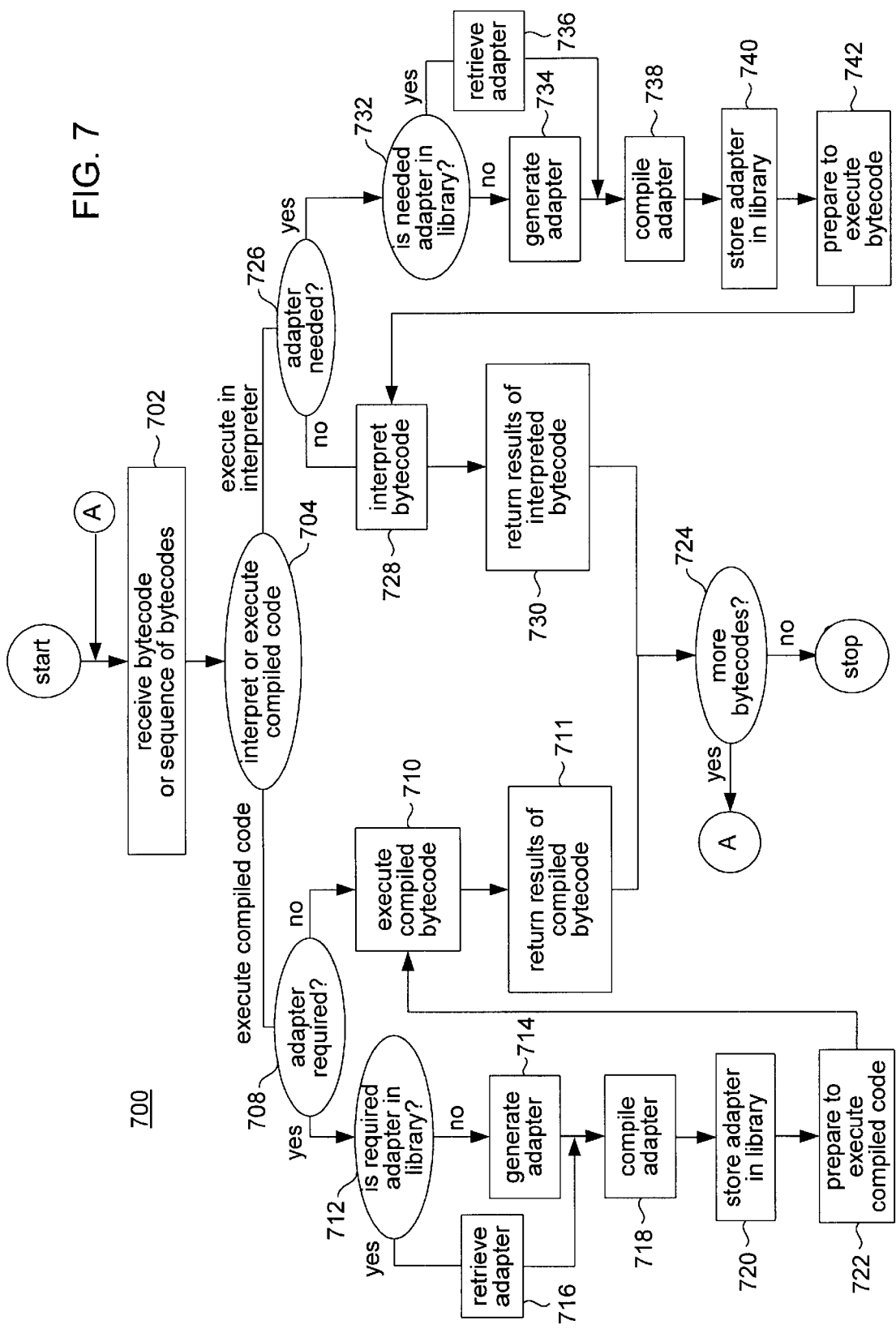
FIG. 7 shows a flowchart for adapter/stub usage in a Java Virtual Machine.

FIG. 7 is a flowchart detailing a process 700 for processing a bytecode or sequence of bytecodes in accordance with an embodiment of the invention. The process 700 begins at 702 when a bytecode or sequence of bytecodes is received. A determination at 704 is made whether the bytecode or sequence of bytecodes will be interpreted or processed by executing compiled code. If the bytecode or sequence of bytecodes is to be processed by executing compiled code, then a determination is made at 708 if an I/C adapter is required. If the adapter is not required, then the bytecode or sequence of bytecodes is processed by executing compiled code at 710 the results of which is returned at 711. If, however, the adapter is required, then a determination is made at 712 if the required adapter is stored in the library. If the required adapter is not stored in the library, then the required adapter is generated at 714 otherwise the required adapter is retrieved from the library at 716. In either case, the adapter is compiled at 718 after which the adapter is stored in the library at 720 and preparation is made to execute the compiled code at 722. Once the preparation is complete, the bytecode or sequence of bytecodes is processed by executing compiled bytecode at 710.

After the results of the execution of the compiled bytecode (or bytecodes) is returned at 711, a determination is made at 724 if more bytecodes are available. If more bytecodes are available, then control is passed to 704 and the bytecode(s) are received, otherwise, the process 700 stops.

Returning to 704, if it was determined that the received bytecode or sequence of bytecodes is to be interpreted, then a determination at 726 is made whether or not the C/I adapter is required. If the adapter is not required, then the bytecode or sequence of bytecodes is interpreted at 728 the result of which is returned at 730. If, however, the adapter is required, then a determination is made at 732 if the required adapter is stored in the library. If the required adapter is not stored in the library, then the required adapter is generated at 734 otherwise the required adapter is retrieved from the library at 736. In either case, the adapter is compiled at 738 after which adapter is stored in the library at 740. At 742 preparation is made to interpret the bytecode (s) after which the bytecode(s) is interpreted at 728 the result of which is returned at 730.

After the results of the interpreted bytecode(s) is returned at 730, a determination is made at 724 if more bytecodes are available. If more bytecodes are available, then control is passed to 704 and the bytecode(s) are received, otherwise, the process 700 stops.

Figure 8:
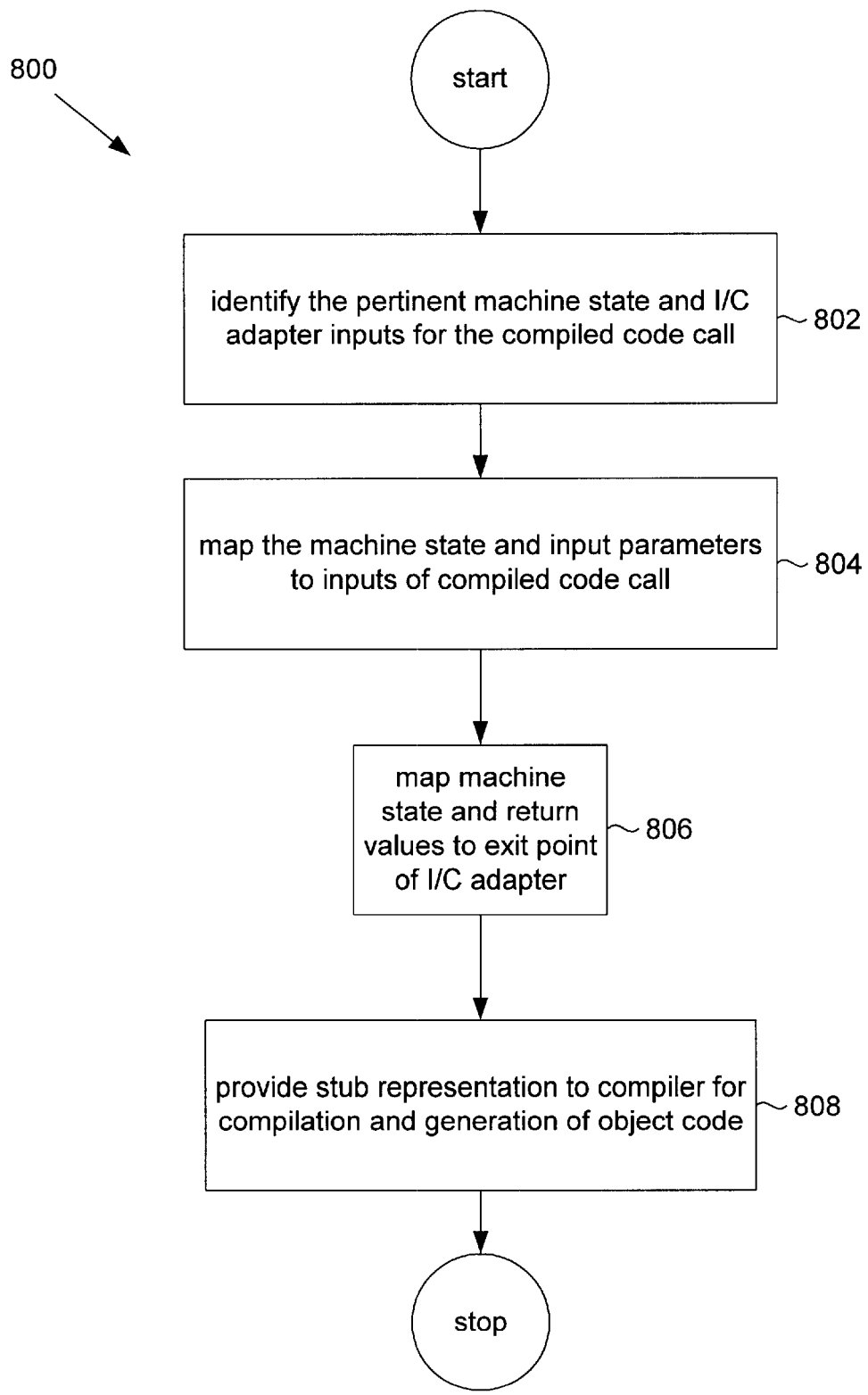
FIG. 8 shows a flowchart for generating an adapter/stub.

FIG. 8 is a flowchart detailing a process 800 for generating an adapter/stub in accordance with the embodiment of the invention. The process 800 begins at 802 by identifying the parameters for the call to compiled code and pertinent machine state. Next, the input parameters and machine state are mapped to the inputs of the compiled code call at 804. At 806, the machine state and return values are mapped to the return point of the interpreter to compiled-code adapter. At 808, the adapter/stub representation is provided to the compiler for compilation and generation of object code.

While the above is a complete description of preferred embodiments of the invention, there is alternatives, modifications, and equivalents may be used. It should be evident that the invention is equally applicable by making appropriate modifications to the embodiments described above. For example, the embodiments described have been in reference to an execution stack including Java frames, but the principles of the present invention may be readily applied to other systems and languages. Therefore, the above description should not be taken as limiting the scope of the invention that is defined by the meets and bounds of the impended claims along with their full scope of equivalents.

What is claimed is:

1. An apparatus for executing a bytecode in runtime system, comprising:

a bytecode source;

an interpreter coupled to the bytecode source used to interpret the bytecode;

a compiler coupled to the bytecode source used to compile the bytecode;

a runtime system coupled to the interpreter and coupled to the compiler, wherein the runtime system is arranged to execute the interpreted bytecode when the bytecode is interpreted by the interpreter, and wherein the runtime system is arranged to execute the compiled bytecode when the bytecode is compiled by the compiler;

an adapter/stub generator unit coupled to the compiler arranged to provide on demand an adapter source code or a stub source code to the compiler;

a library coupled to the compiler and the runtime system arranged to store adapters and stubs compiled by the compiler, wherein when the runtime system retrieves an adapter when required.

2. An apparatus as recited in claim 1, wherein the bytecode is one of a series of bytecodes.

3. An apparatus as recited in claim 1, wherein the adapter generator is provided with adapter input parameters used to generate the required adapter.

4. A computer program product that implements an apparatus for processing a bytecode, comprising:

computer code that interprets a received bytecode;

computer code that compiles the received bytecode;

computer code that generates an adapter when requested by the compiler;

computer code that stores the adapter and provides the adapter to a runtime system when executing compiled or interpreted bytecodes; and a computer readable medium that stores the computer codes.

5. In a computer system, a method for processing a bytecode in a runtime environment, the method comprising:

determining if an adapter is required in order to process the bytecode;

determining if the adapter is located in an adapter library if the adapter is required;

generating the adapter if it is determined that the required adapter is not in the library;

storing the generated adapter in the library providing the adapter to the runtime environment; and executing the bytecode.

6. A computer program product that processes an bytecode in a runtime environment, comprising:

computer code that provides a bytecode;

computer code that determines if an adapter is required to execute the bytecode and generates the required adapter when the required adapter is not present in an adapter library and provides the required adapter to the runtime system on demand; and a computer readable medium that stores the computer codes.

7. The computer program product of claim 6, wherein the computer readable medium is selected from the group consisting of CD-ROM, floppy disk, tape, flash memory, system memory, hard drive, and data signal embodied in a carrier wave.

* * * * *